(12) United States Patent
Suzuki (10) Patent No.: US 11,890,560 B2
(45) Date of Patent: Feb. 6, 2024

(54) FILTER WITH ELECTROSTATIC DISCHARGE MITIGATION SLEEVE

(71) Applicant: ENTEGRIS, INC., Billerica, MA (US)

(72) Inventor: Yasuji Suzuki, Tokyo (JP)

(73) Assignee: ENTEGRIS, INC., Billerica, MA (US)

( * ) Notice: Subject to any disclaimer, the term of this patent is extended or adjusted under 35 U.S.C. 154(b) by 681 days.

(21) Appl. No.: 16/857,918

(22) Filed: Apr. 24, 2020

(65) Prior Publication Data

US 2020/0346146 A1    Nov. 5, 2020

Related U.S. Application Data

(60) Provisional application No. 62/842,942, filed on May 3, 2019.

(51) Int. Cl.
| | |
|---|---|
| *B01D 35/31* | (2006.01) |
| *H01B 1/12* | (2006.01) |
| *B01D 29/11* | (2006.01) |

(52) U.S. Cl.
CPC ............. *B01D 35/31* (2013.01); *H01B 1/124* (2013.01); *B01D 29/11* (2013.01); *B01D 2201/50* (2013.01)

(58) Field of Classification Search
CPC .... B01D 35/31; B01D 29/11; B01D 2201/50; B01D 35/30; B01D 35/308; B01D 39/1692; H01B 1/124; F16L 25/01; F16L 47/04

See application file for complete search history.

(56) References Cited

U.S. PATENT DOCUMENTS

| | | | | |
|---|---|---|---|---|
| 3,933,643 | A * | 1/1976 | Colvin | B01D 39/2013 55/498 |
| 5,076,920 | A | 12/1991 | Danowski | |
| 5,382,359 | A | 1/1995 | Brandt | |
| 6,905,141 | B2 * | 6/2005 | Winter | C03C 17/3405 285/364 |
| 8,997,783 | B2 * | 4/2015 | Zachovalova | F02M 37/32 210/243 |
| 2003/0000592 | A1 | 1/2003 | Wellman | |
| 2007/0241036 | A1 * | 10/2007 | Amesoeder | B01D 27/08 210/243 |
| 2011/0067370 | A1 | 3/2011 | Schumann | |
| 2011/0225776 | A1 | 9/2011 | Langley et al. | |
| 2019/0091617 | A1 | 3/2019 | Jaber | |

FOREIGN PATENT DOCUMENTS

| | | | |
|---|---|---|---|
| CN | 102711951 A | 10/2012 | |
| CN | 103764248 A | 4/2014 | |
| CN | 207339482 U | 5/2018 | |
| CN | 207628066 U | 7/2018 | |
| CN | 109195682 A | 1/2019 | |
| CN | 213132242 U | 5/2021 | |
| DE | 19925098 A1 * | 12/2000 | ............. B01D 27/08 |
| JP | 2014177293 A | 9/2014 | |
| JP | 2017084781 A | 5/2017 | |
| JP | 2019037952 A | 3/2019 | |
| TW | 201805053 A | 2/2018 | |
| WO | 2017210293 A1 | 12/2017 | |
| WO | 20172102912 W | 12/2017 | |
| WO | WO-2017210291 A2 * | 12/2017 | ......... B01D 39/1692 |
| WO | WO-2018050602 A1 * | 3/2018 | ........... B01D 27/005 |

* cited by examiner

*Primary Examiner* — Terry K Cecil (57) ABSTRACT

This disclosure reports embodiments of a fluid filter for ESD mitigation having a conductive polymer sleeve. Embodiments of this filter may include a conductive sleeve and tie bands to mitigate electrostatic discharge.

18 Claims, 7 Drawing Sheets

FILTER WITH ELECTROSTATIC DISCHARGE MITIGATION SLEEVE

This application claims the benefit of U.S. Application No. 62/842,942 filed on May 3, 2019, which is hereby incorporated by reference in its entirety.

TECHNICAL FIELD

Embodiments of the present disclosure are generally directed to a fluid filter, and more specifically, to a fluid filter with an electrostatic discharge mitigation sleeve.

BACKGROUND

High purity fluid handling systems have many uses in advanced technology applications. These applications include processing and manufacturing of solar panels, flat panel displays, and in the semiconductor industry for applications such as photolithography, bulk chemical delivery, chemical mechanical polishing (CMP), wet etch, and cleaning. Certain chemicals used in these applications are aggressive, high purity organic solvents precluding the use of some conventional fluid handling technology.

In order to meet the high purity requirements for such applications, suitable fluid handling systems provide filters, tubing, fittings, valves, and other elements, that are made from inert polymers. These inert polymers may include, but are not limited to, fluoropolymers such as tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP). These materials are susceptible to a buildup of electrostatic charge that can lead to damage of the fluid handling system.

Built up electrostatic static charge can discharge from within the fluid handling system to the exterior environment, potentially damaging components in the fluid handling system (e.g. tubing or piping, fittings, components, containers, filters, etc.), that may lead to leaks, spills of fluid in the system, and diminished performance of components. In these situations, such discharge, may lead to potential fire or explosion when flammable, toxic and/or corrosive fluids are used in the compromised fluid handling system.

Electrostatic discharge (ESD) is an important technical issue for fluid handling systems in the semiconductor industry and in other technology applications. Frictional contact between fluids and surfaces of various operational components (e.g. tubing or piping, valves, fittings, filters, etc.) in the fluid system can result in generation and buildup of static electrical charges. The extent of charge generation depends on various factors including, but not limited to, the nature of the components and the fluid, fluid velocity, fluid viscosity, electrical conductivity of the fluid, pathways to ground, turbulence and shear in liquids, presence of air in the fluid, and surface area. There is a need to find solutions for dissipating electrostatic charge in fluid handling systems in general as well as the filters present in the fluid handling systems.

SUMMARY

One or more embodiments of this disclosure are related to a fluid filter having an electrostatic mitigation sleeve.

In certain embodiments, an electrostatic mitigation filter comprises a filter element, a filter housing, one or more endcaps, an electrically conductive polymer sleeve, and electrically conductive polymer tie bands.

In some embodiments, the filter has one endcap; in other embodiments the filter has two end caps.

A suitable electrically conductive polymer sleeve may comprise an electrically conductive fluoropolymer such as, but not limited to, an electrically conductive polymer selected from the group consisting of tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), polyvinylidene fluoride (PVDF), and mixtures thereof. In one embodiment, the electrically conductive polymer sleeve comprises perfluoroalkoxy alkane polymer. In some embodiments the electrically conductive polymer sleeve is an extruded tube, in other embodiments the electrically conductive polymer sleeve is a cylindrical sheet, in still other embodiments the electrically conductive polymer sleeve is a flat sheet or rolling mill sheet. Further, the disclosed the electrically conductive polymer sleeve may be reusable.

In some embodiments, the filter has a first electrically conductive polymer tie band to secure the electrically conductive polymer sleeve to the filter housing and for connecting to ground and a second electrically conductive polymer tie band to also secure the electrically conductive polymer sleeve to the filter housing. Suitable electrically conductive tie bands comprise electrically conductive fluoropolymers or electrically conductive poly olefins. In one embodiment, the electrically conductive tie bands comprise electrically conductive polypropylene.

Various embodiments of the disclosed filter have electric charge and resistivity properties. In one embodiment, the filter has measured charge of about +/−1 kV when a charge-generating fluid flows through the filter. In other embodiments, the electrically conductive polymer sleeve has an outer surface resistivity of about less than about 1E+4 ohm, from 1E ohm to about 1E+4 ohm, or about 0.9E+2 ohm to about 4E+3 ohm, preferably the conductive polymer sleeve has an outer surface resistivity of about 1E+3 ohm to about 3E+3 ohm. In some embodiments, the electrically conductive polymer sleeve has an inner surface resistivity less than about 1E+4 ohm, from 1E ohm to about 1E+4 ohm, or form about of about 0.9E+2 ohm to about 2E+3 ohm, preferably the conductive polymer sleeve has an inner surface resistivity of about 1E+3 ohm to about 1.5E+3 ohm. In some embodiments, the conductive tie bands have a resistivity of less than about 1E+4 ohm, from 1E ohm to about 1E+4 ohm, or about 2E+3 ohm to about 4E+3 ohm.

One or more disclosed embodiments may include an electrostatic discharge kit comprising an electrically conductive polymer sleeve and electrically conductive polymer tie bands.

Additional embodiments may include a fluid handling system comprising an electrostatic mitigation filter.

Additional embodiments may also include a method of mitigating electrostatic discharge in a fluid handling system comprising installing an electrostatic mitigation filter in the fluid handling system.

The above summary is not intended to describe each illustrated embodiment or every implementation of the present disclosure. The embodiments of this disclosure are amenable to various modifications and alternative forms, and certain specifics have been shown, for example, in the drawings and will be described in detail. It is understood that the intention is not to limit the disclosure to the particular embodiments described; the intention is to cover all modifications, equivalents, and alternatives falling within the spirit and scope of this disclosure.

BRIEF DESCRIPTION OF THE DRAWINGS

The drawings included in this disclosure illustrate embodiments of the present disclosure and, along with the description, serve to explain the principles of the disclosure. The drawings are only illustrative of certain embodiments and do not limit the disclosure.

DETAILED DESCRIPTION

This disclosure reports embodiments of a fluid filter for ESD mitigation having a conductive polymer sleeve. Embodiments of this filter may include a conductive sleeve and tie bands to mitigate electrostatic discharge.

Figure 1A:
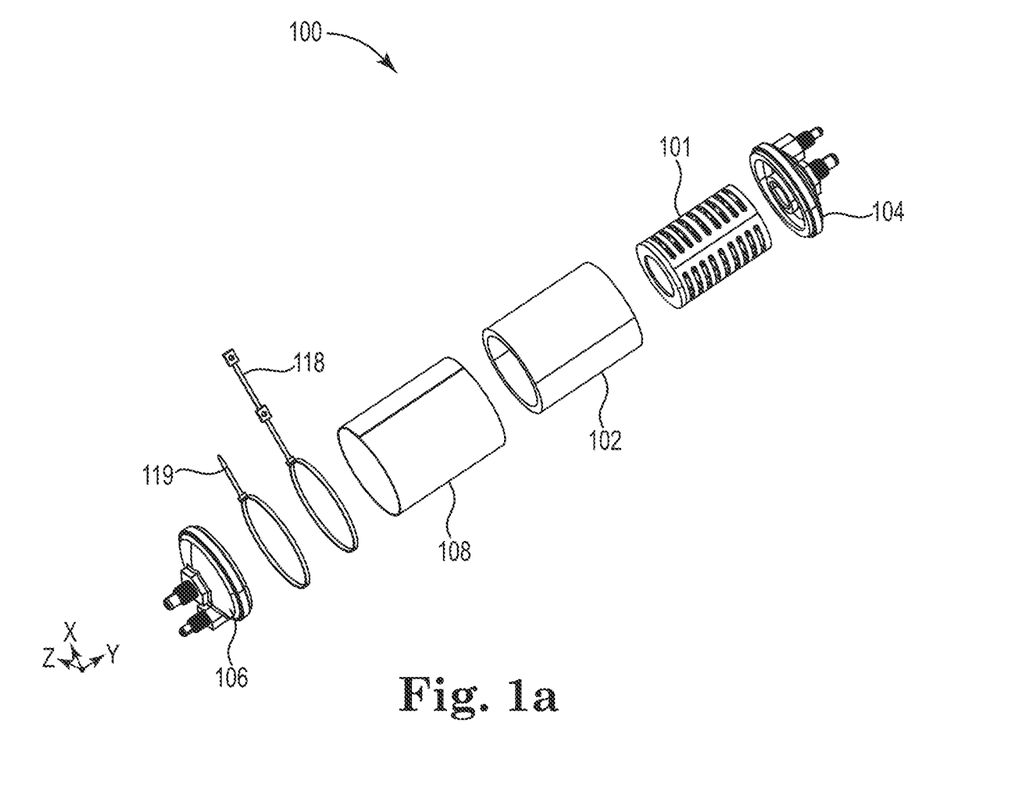
FIG. 1a depicts an exploded isometric view of a filter having two end caps, according to one or more embodiments of this disclosure.

FIG. 1a illustrates one embodiment of an ESD mitigation filter. This exploded isomeric view of filter 100 that includes filter housing 102, two conductive end caps 104 and 106, and outer electrically conductive polymer sleeve 108. Housing 102 includes an interior filter element 101 that in some embodiments is a replaceable component; while in other embodiments the filter element is a fixed, non-replaceable component. In various embodiments, housing 102 may be made of a polymeric material such as, for example, tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP), polychlorotrifluoroethylene (PCTFE), polyvinylidene fluoride (PVDF), or mixtures thereof. Both conductive end caps 104 and 106 may also be made of a polymeric material that is the same or a different polymeric material than the housing such as, for example, tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP), polychlorotrifluoroethylene (PCTFE), polyvinylidene fluoride (PVDF), or mixtures thereof. In some embodiments, electrically conductive polymer sleeve 108 may be a fluoropolymer. In some embodiments, the fluoropolymer may be selected from the group consisting of tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), polyvinylidene fluoride (PVDF), and mixtures thereof. In some embodiments, the electrically conductive polymer sleeve comprises perfluoroalkoxy alkane polymer. Each end cap 104, 106 includes fittings for connecting the end caps to housing 102. In some embodiments, the connection may be removable, while in other embodiments the connection may be fixed or permanent. In addition, each end cap 104 and 106 include one or more connector fittings to connect each end cap to tubing segments (not shown), in order to provide a fluid passageway from a tubing segment through one end cap and housing to another end cap and tubing segment. In certain embodiments, the connector fitting includes, for example, a nipple portion, threaded portion, shoulder portion and fitting nut to provide a conductive connection as well as a leak-proof passageway from tubing segments and filter 100. Electrically conductive polymer sleeve 108 extends over the exterior surface of the housing 102. In some embodiments, the electrically conductive polymer sleeve 108 includes a base polymeric material and an electrically conductive filler material. In some embodiments, the base polymeric material may be a fluoropolymer selected from the group consisting of tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), polyvinylidene fluoride (PVDF), and mixtures thereof. In some embodiments, the electrically conductive filler material includes, but is not limited to, carbon. In some embodiments, the electrically conductive polymer material is a carbon-loaded PFA. In some embodiments, electrically conductive polymer sleeve 108 provides an electrically conductive connection between the filter 100 and tie bands 118 and 119, respectively. In some embodiments, sleeve 108 is an extruded tubing, in other embodiments is a cylindrical sheet, and in still other elements is made from a flat sheet or rolling mill sheet. In one or more embodiments, the tie bands 118 and 119 are a conductive polymer material that is electrically and conductively connected with electrically conductive polymer sleeve 108 to ground. For example, tie bands 118 and 119 can be connected to an electrical contact which is grounded in order to configure the filter for ESD mitigation. In one or more embodiments, the tie bands have tab attachments for a bolt and nut, a screw, or other threaded connector. In some embodiments, the attachment feature is a tab, a threaded hole, or other suitable feature for connecting to an electrical contact. In certain embodiments, the attachment feature can be configured for interference fit, snap fit, friction fit, or other method of fitting with an electrical contact. In some embodiments, tie bands 118 and 119 may be an electrically conductive polymer. In some embodiments, the tie bands 118 and 119 include a base polymeric material and an electrically conductive filler material. In some embodiments, the base polymeric material may be a fluoropolymer selected from the group consisting of tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), poly vinylidene fluoride (PVDF), and mixtures thereof. In some embodiments, the base polymeric material may be a polyolefin, including, but not limited to, polypropylene. In some embodiments, the electrically conductive filler material includes, but is not limited to, carbon.

Figure 1B:
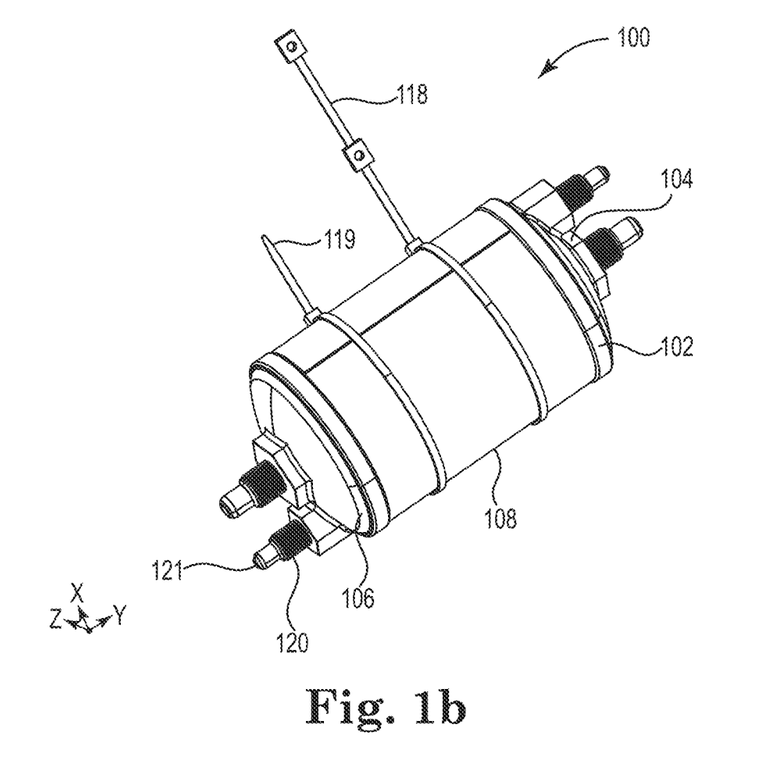
FIG. 1b depicts an isometric view of a filter having two end caps, according to one or more embodiments of this disclosure.

In certain embodiments as illustrated in FIG. 1b, ESD mitigation filter 100 includes housing 102, end caps 104 and 106, electrically conductive polymer sleeve 108, and tie bands 118 and 119. In addition, filter 100 includes drain fitting 120 and drain plug 121.

Figure 2A:
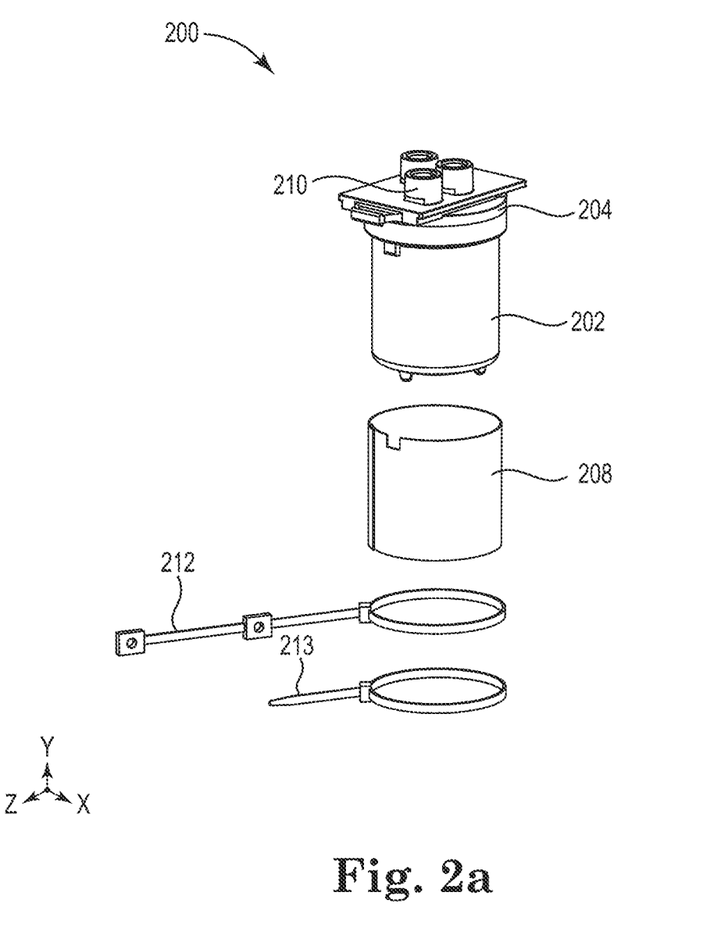
FIG. 2a depicts an exploded isometric view of a filter having one end cap, according to one or more embodiments of this disclosure.

FIG. 2a also illustrates one embodiment of an ESD mitigation filter. This exploded isomeric view of filter 200 includes housing 202, a single end cap 204, and outer electrically conductive polymer sleeve 208. Housing 202 includes an interior filter element (not shown) that in some embodiments is a replaceable component; while in other embodiments the filter element is a fixed, non-replaceable component. In various embodiments, housing 202 may be a polymeric material and in certain embodiments may be tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), and fluorinated ethylene propylene polymer (FEP)), polychlorotrifluoroethylene (PCTFE), polyvinylidene fluoride (PVDF), or mixtures thereof. End cap 204 may be a polymeric material as described above that is the same as or different than the polymeric material of the housing. End cap 204 includes fittings for connecting the end cap to housing 202. In some embodiments, the connection may be removable, while in other embodiments the connection may be fixed or permanent. In addition, end cap 204 includes one or more connector fittings 210 to connect the end cap to tubing segments in order to provide both connective and fluid passageways from a tubing segment through a conductor fitting through the housing to another conductor fitting and tubing segment. In certain embodiments, the connector fittings include, for example, a nipple portion, threaded portion, shoulder portion, and fitting nut, as described above, to provide conductive connections as well as a leak-proof fluid passageway from tubing segments and filter 200. Electrically conductive polymer sleeve 208 extends over the exterior surface of both the housing 202. The sleeve 208 may be the same material as described above with reference to sleeve 108. In some embodiments, electrically conductive polymer sleeve 208 is a shrink wrap polymer that may be placed over the exterior of housing 202 and connected to the exterior surfaces by applying heat to the sleeve using conventional apparatus and process. ESD mitigation filter 200 also includes attachment tie bands 212 and 213, respectively. In one or more embodiments, the tie bands are a conductive material that is conductively connected with sleeve 208 for attachment to an external electrical contact and then to ground. In some embodiments, the tie bands have a tab, a threaded hole, or other suitable feature for connecting to an electrical contact. In certain embodiments, the tie bands can be configured for interference fit, snap fit, friction fit, or other method of fitting with an electrical contact. Tie bands 212 and 213 may be the same material as described above with reference to tie bands 118 and 119.

Figure 2B:
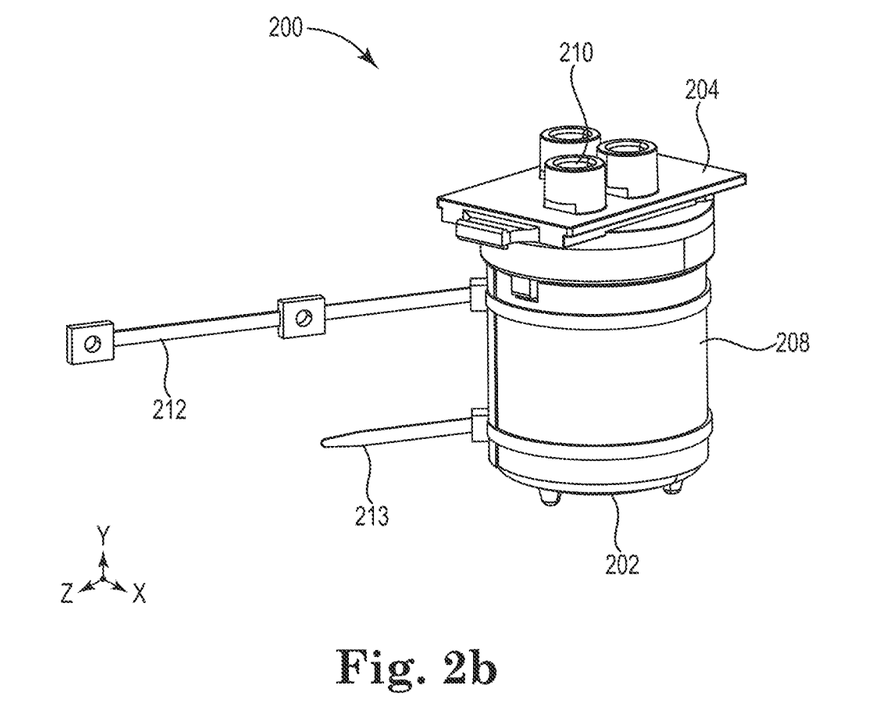
FIG. 2b depicts an isometric view of one end cap, according to one or more embodiments of this disclosure.

FIG. 2b illustrates an embodiment of an ESD filter 200 that includes housing 202, end cap 204, electrically conductive polymer sleeve 208 and ties bands 212 and 213.

Figure 3:
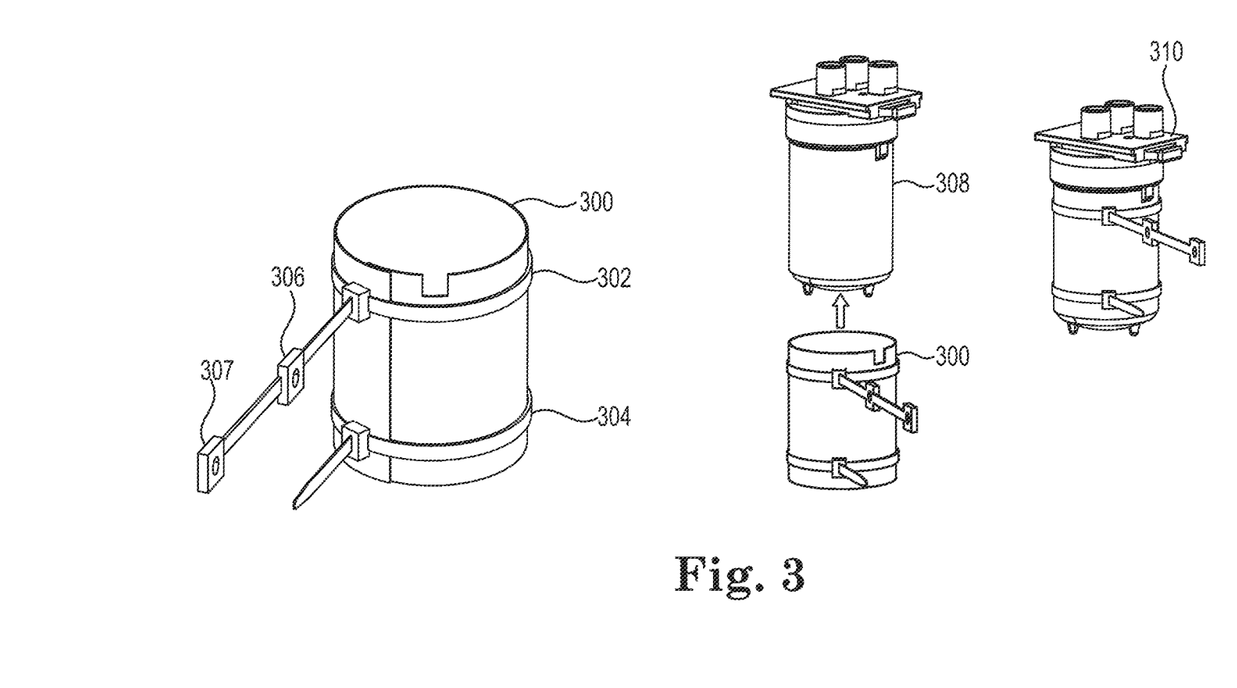
FIG. 3 depicts an electrostatic mitigation kit for a filter, according to one of more embodiments of this disclosure.

FIG. 3 illustrates an electrostatic discharge kit and the use of this kit with a filter. The kit comprises an electrically conductive polymer sleeve 300. In some embodiments, electrically conductive polymer sleeve 300 may be the same material as described above with reference to sleeves 108 and 208. In some embodiments, the electrically conductive polymer sleeve 300 is preferably made from electrically conductive perfluoroalkane polymer. The kit also comprises two ties bands 302 and 304, respectively. In some embodiments, tie bands 302 and 304 may be the same material as described above with reference to tie bands 118 and 118 and tie bands 212 and 213. In some embodiments, both tie bands 118 and 119, are preferably made of conductive polypropylene polymer. In some embodiments, tie band 302 further comprises tabs 306 and 307 that are used as attachment fittings to connect the tie bands and sleeve to ground in order to mitigate electrostatic discharge. When used, the kit 300 fits over the outside of the filter 308. When the kit is in place, tie bands 302 and 304 tightened in order to securely and conductively attach the sleeve to the filter and provide an ESD filter 310.

The ESD mitigation filter of this disclosure may be used in ESD mitigation fluid circuits. Representative ESD mitigation circuits are reported, for example, in International patent application, WO 2017/210293, which is incorporated herein by reference, except for express definitions or patent claims contained therein.

Figure 4:
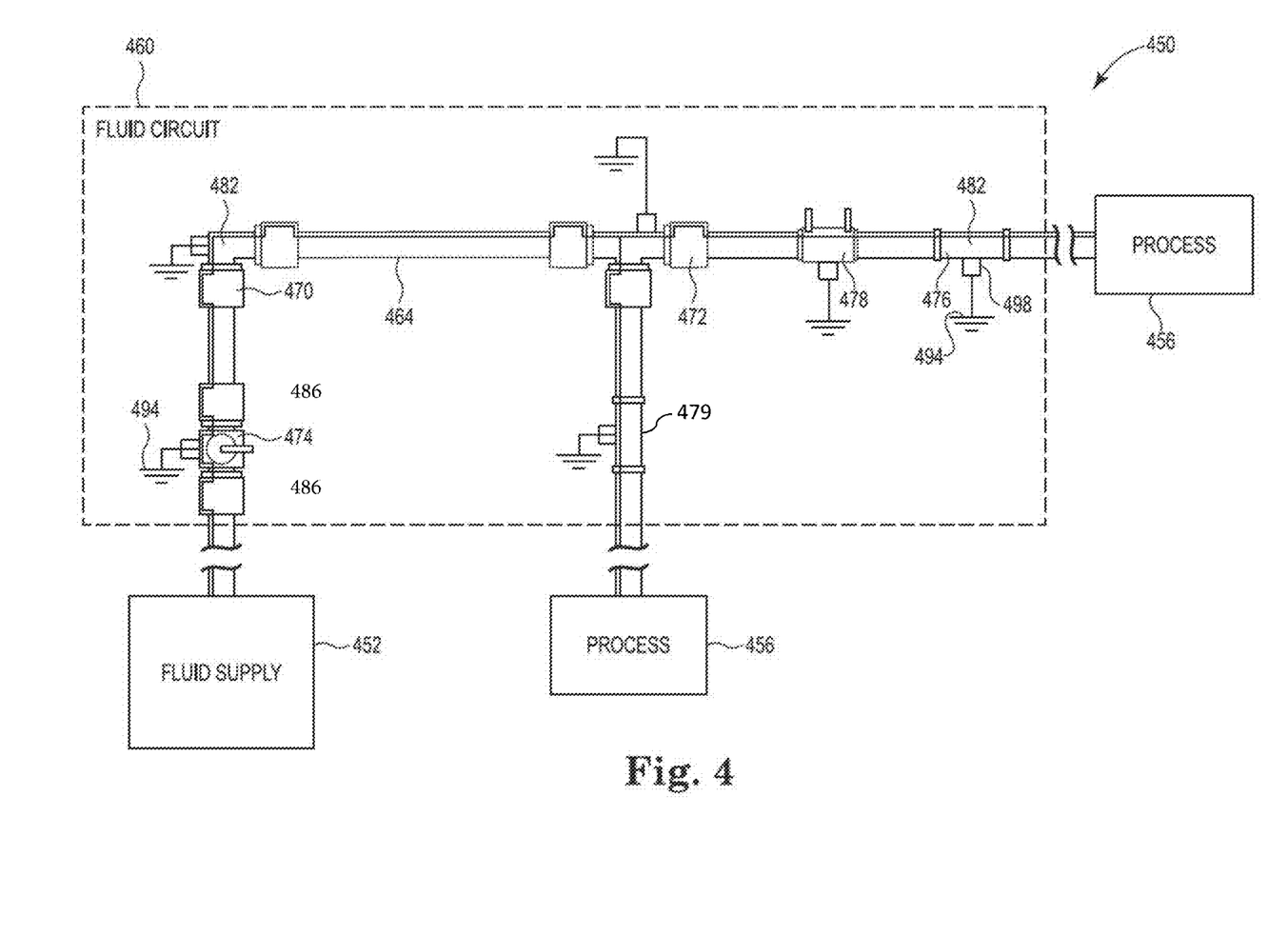
FIG. 4 depicts a fluid handling system, according to one or more embodiments of this disclosure.

An exemplary ESD circuit includes a fluid handling system 450 illustrated in FIG. 4. The system 450 provides a flow path for fluid to flow from a fluid supply 452 to one or more process stages 456 positioned downstream of the source of fluid supply. System 450 includes a fluid circuit 460 which includes a portion of the flow path of the fluid handling system 450. The fluid circuit 460 includes tubing segments 464 and a plurality of operative components that are interconnected via the tubing segments 464. In FIG. 4, the operative components include an elbow shaped fitting 470. T-shaped fitting 472, valve 474. ESD mitigation filter 476, flow sensor 478, and straight fitting 479. In various embodiments, the fluid circuit 460 can include additional or fewer operative components in number and in type. For example, the fluid circuit 460 could substitute or additionally include pumps, mixers, dispense heads, sprayer nozzles, pressure regulators, flow controllers, or other types of operational components. In assembly, the operative components are connected together by the plurality of tubing segments 464 connecting to the components at their respective tubing connector fittings. Connected together, the plurality of tubing segments 464 and operative components provide a fluid passageway through the fluid circuit 460 from the fluid supply 452 and toward the process stages 456. In certain embodiments, the operational components each include, for example, a body portion 482 that defines fluid flow passageway and one or more tubing connector fittings. In some embodiments, at least one of the tubing connector fittings is an inlet portion for receiving fluid into the body portion 482 and at least another one of the tubing connector fittings is an outlet portion for outputting fluid received via the inlet portion. For example, T-shaped fitting 472 includes one tubing connector fitting that is an inlet portion that receives fluid from the fluid supply 452 and two tubing connector fittings 486 which are outlet portions outputting fluid toward the process stages 456. In certain embodiments, the inlet portion and the outlet portion are each connected or connectable to a tubing segment 464. In some embodiments, for example where the operative components in the fluid circuit 460 includes a spray nozzle, only the inlet portion is required to be connectable to a tubing segment 464. In some embodiments one or more of the operative components includes a single tubing connector or fitting 479.

Various embodiments of the disclosed ESD mitigation filter have electric charge and resistivity properties. In one embodiment, the filter has measured charge of less than +1 kV (a range of about −1 kV to about +1 kV) when a charge-generating fluid flows through the filter. In some embodiment, the conduction polymer sleeve has a resistivity of about 1E+1 to about 1E+4. In other embodiments, the conductive polymer sleeve has an outer surface resistivity of about 0.9E+2 ohm to about 4E+3 ohm, preferably the conductive polymer sleeve has an outer surface resistivity of about 1E+3 ohm to about 3E+3 ohm. In some embodiments, the conductive polymer sleeve has an inner surface resistivity of about 1E to about +4E ohm, from about 0.9E+2 ohm to about 2E+3 ohm, preferably the conductive polymer sleeve has an inner surface resistivity of about 1E+3 ohm to about 1.5E+3 ohm. In some embodiments, the conductive tie bands have a resistivity of about of about 1E+1 ohm to about 1E+4 ohm. In other embodiments, the conductive tie bands have a resistivity of about of about 2E+3 ohm to about 4E+3 ohm.

Example 1 Electrostatic Mitigation Measurements

Figure 5:
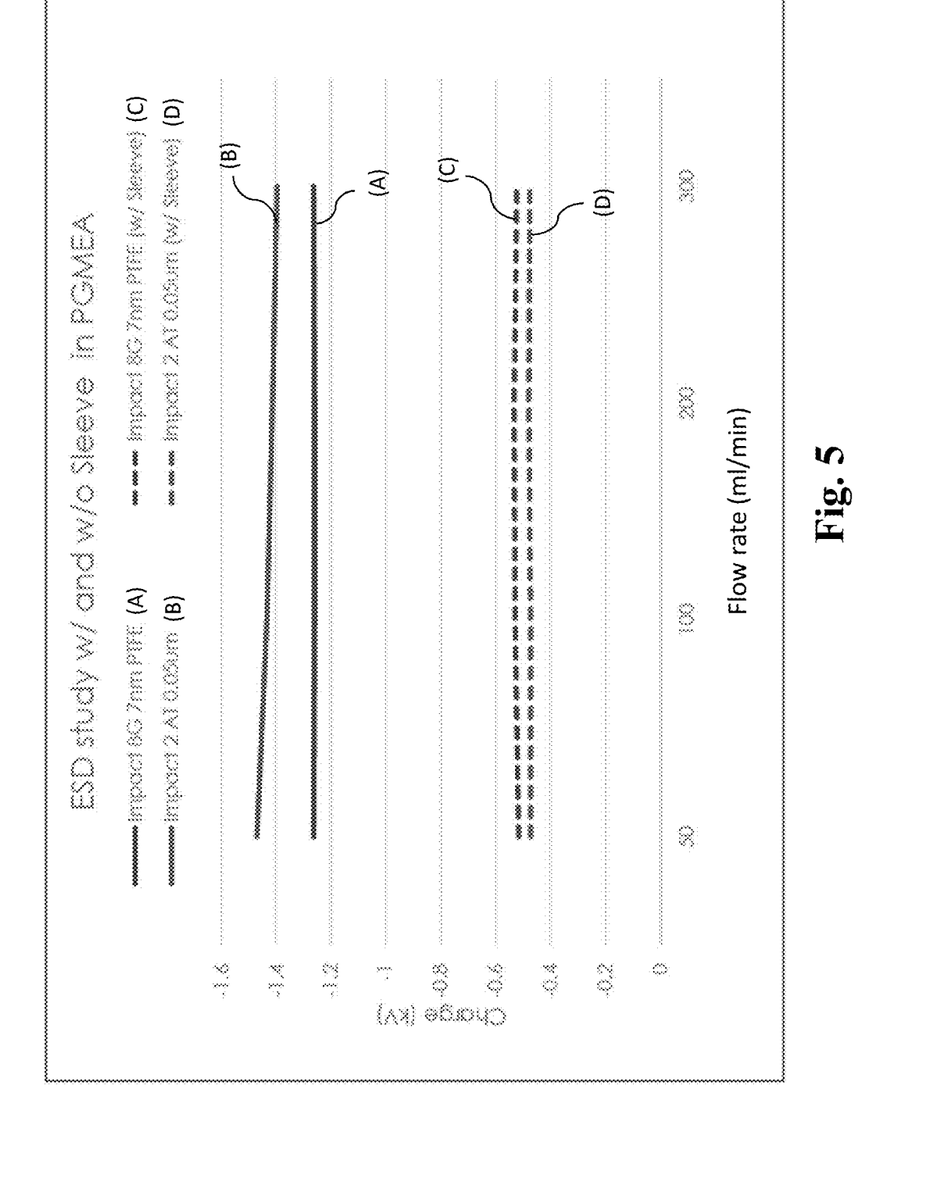
FIG. 5 shows the electrostatic discharge values from Example 1 at various flow rates.

This example measured the amount of electric charge generated by flowing propylene glycol methyl ether acetate (PGMEA) through two commercially available filters, an IMPACT 8G 7 nm PTFE filter and an IMPACT 2 AT 0.05 um filter (both available from Entegris, Inc., Billerica, Mass.). The buildup of charge was measured with an ESD meter for a filter having an ESD sleeve according to this disclosure and for a filter not having an ESD sleeve. The ESD was measured a flow rates of 50, 100, 200 and 300 ml/min at room temperature. The measured charge is shown in FIG. 5

The data demonstrates that the ESD charge values (kV) for the filters with an ESD sleeve are lower than for the filters without the ESD sleeve.

In a first aspect, an electrostatic mitigation filter comprises a filter element, a filter housing, one or more endcaps, an electrically conductive polymer sleeve, and one or more electrically conductive polymer tie bands.

A second aspect according to the first aspect, wherein the filter has one endcap.

A third aspect according to the first aspect, wherein the filter has two end caps.

A fourth aspect according to the first aspect, wherein a first electrically conductive polymer tie band for connecting to ground and a second electrically conductive polymer tie band to secure the electrically conductive polymer sleeve to the filter housing.

A fifth aspect according to any of the previous aspects, wherein the electrically conductive polymer sleeve comprises electrically conductive fluoropolymers.

A sixth aspect according to any of the previous aspects, wherein the electrically conductive polymer sleeve comprises an electrically conductive polymer selected from the group consisting of tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), polyvinylidene fluoride (PVDF), and mixtures thereof.

A seventh aspect according to any of the previous aspects, wherein the electrically conductive polymer sleeve comprises perfluoroalkoxy alkane polymer.

An eighth aspect according to any of the previous aspects, wherein the one or more electrically conductive polymer tie bands comprise electrically conductive fluoropolymers or electrically conductive polyolefins.

A ninth aspect according to any of the previous aspects, wherein the one or more electrically conductive polymer tie bands comprise electrically conductive polypropylene.

A tenth aspect according to any of the previous aspects, wherein the electrically conductive polymer sleeve is an extruded tube.

An eleventh aspect according to any of the previous aspects, wherein the electrically conductive polymer sleeve is a cylindrical sheet.

A twelfth aspect according to any of the previous aspects, having a measured charge of less than +/−1 kV when a charge-generating fluid flows through the filter.

A thirteenth aspect according to any of the previous aspects, wherein the electrically conductive polymer sleeve has an outer surface resistivity of about 0.9E+2 ohm to about 1E+4 ohm.

A fourteenth aspect according to any of the first through twelfth aspects, wherein the electrically conductive polymer sleeve has an outer surface resistivity of about 1E+3 ohm to about 1E+4 ohm.

A fifteenth aspect according to any of the first through twelfth aspects, wherein the electrically conductive polymer sleeve has an inner surface resistivity of about 0.9E+2 ohm to about 1E+4 ohm.

A sixteenth aspect according to any of the first through twelfth aspects, wherein the electrically conductive polymer sleeve has an inner surface resistivity of about 1E+3 ohm to about 1E+4 ohm.

A seventeenth aspect according to any of the previous aspects, wherein the one or more electrically conductive polymer tie bands have a resistivity of about of about 1E ohm to about 1E+4 ohm.

An eighteenth aspect according to any of the previous aspects, wherein the electrically conductive polymer sleeve is reusable.

In a nineteenth aspect, an electrostatic discharge kit comprises an electrically conductive polymer sleeve and electrically conductive tie bands.

In a twentieth aspect, a fluid handling system comprises an electrostatic mitigation filter of any one of the first through eighteenth aspects.

In a twenty-first aspect, a method of mitigating electrostatic discharge in a fluid handling system comprises installing an electrostatic mitigation filter of any one of the first through eighteenth aspects in the fluid handling system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An electrostatic mitigation filter comprising:
   a filter element,
   a filter housing made of a first polymeric material,
   first and second endcaps mounted to opposite ends of the filter housing and made of a second polymeric material different from the first polymeric material of the filter housing, each of the one or more endcaps is a conductive endcap comprising one or more connector fittings to connect each endcap to a tubing segment of a fluid circuit to provide a fluid passageway from a first tubing segment through one endcap and housing to another endcap and a second tubing segment, an electrically conductive polymer sleeve that comprises electrically conductive fluoropolymers selected from the group consisting of perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), and mixtures thereof, and one or more electrically conductive polymer tie bands comprising electrically conductive polyolefins, wherein the one or more electrically conductive polymer tie bands are connected electrically and conductively with the electrically conductive polymer sleeve to ground, wherein the filter element is within an interior of the filter housing, and the electrically conductive polymer sleeve extends over an exterior surface of the filter housing from the first end cap to the second end cap and provides an electrically conductive connection with the one or more electrically conductive polymer tie bands.

2. The electrostatic mitigation filter of claim 1, wherein the one or more connector fittings comprise a nipple portion, a threaded portion, a shoulder portion, and a fitting nut to provide conductive connections and a leak-proof fluid passageway from the tubing segment and the electrostatic mitigation filter.

3. The electrostatic mitigation filter of claim 1, wherein the electrostatic mitigation filter has a first electrically conductive polymer tie band for connecting to ground and a second electrically conductive polymer tie band to secure the electrically conductive polymer sleeve to the filter housing.

4. The electrostatic mitigation filter of claim 1, wherein the first polymeric material is selected from the group consisting of tetrafluoroethylene polymer (PTFE), perfluoroalkoxy alkane polymer (PFA), ethylene and tetrafluoroethylene polymer (ETFE), ethylene, tetrafluoroethylene and hexafluoropropylene polymer (EFEP), fluorinated ethylene propylene polymer (FEP), polychlorotrifluoroethylene (PCTFE), polyvinylidene fluoride (PVDF), and mixtures thereof.

5. The electrostatic mitigation filter of claim 1, wherein the electrically conductive polymer sleeve comprises perfluoroalkoxy alkane polymer.

6. The electrostatic mitigation filter of claim 1, wherein the one or more electrically conductive polymer tie bands comprise electrically conductive fluoropolymers.

7. The electrostatic mitigation filter of claim 1, wherein the one or more electrically conductive polymer tie bands comprise electrically conductive polypropylene.

8. The electrostatic mitigation filter of claim 1, wherein the electrically conductive polymer sleeve is an extruded tube.

9. The electrostatic mitigation filter of claim 1, wherein the electrically conductive polymer sleeve is a cylindrical sheet.

10. The electrostatic mitigation filter of claim 1, having a measured charge of less than +/−1 kV when a charge-generating fluid flows through the electrostatic mitigation filter.

11. The electrostatic mitigation filter of claim 1, wherein the electrically conductive polymer sleeve has an outer surface resistivity of about 0.9E+2 ohm to about 1E+4 ohm.

12. The electrostatic mitigation filter of claim 1, wherein the electrically conductive polymer sleeve has an outer surface resistivity of about 1E+3 ohm to about 1E+4 ohm.

13. The electrostatic mitigation filter of claim 1, wherein the electrically conductive polymer sleeve has an inner surface resistivity of about 0.9E+2 ohm to about 1E+4 ohm.

14. The electrostatic mitigation filter of claim 1, wherein the electrically conductive polymer sleeve has an inner surface resistivity of about 1E+3 ohm to about 1E+4 ohm.

15. The electrostatic mitigation filter of claim 1, wherein the one or more electrically conductive polymer tie bands have a resistivity of about of about 1E ohm to about 1E+4 ohm.

16. The electrostatic mitigation filter of claim 1, wherein the electrically conductive polymer sleeve is reusable.

17. A fluid handling system comprising the electrostatic mitigation filter of claim 1.

18. A method of mitigating electrostatic discharge in a fluid handling system comprising installing the electrostatic mitigation filter of claim 1 in the fluid handling system.

* * * * *